United States Patent
Sunahara et al.

(10) Patent No.: US 10,266,173 B2
(45) Date of Patent: Apr. 23, 2019

(54) VEHICLE BEHAVIOR CONTROL DEVICE

(71) Applicant: MAZDA MOTOR CORPORATION, Hiroshima (JP)

(72) Inventors: Osamu Sunahara, Hiroshima (JP); Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/342,857

(22) Filed: Nov. 3, 2016

(65) Prior Publication Data

US 2017/0129482 A1    May 11, 2017

(30) Foreign Application Priority Data

Nov. 6, 2015  (JP) .................................. 2015-218641

(51) Int. Cl.
*B60W 30/045*        (2012.01)

(52) U.S. Cl.
CPC ....... *B60W 30/045* (2013.01); *B60W 2520/14* (2013.01); *B60W 2540/18* (2013.01); *B60W 2710/1055* (2013.01)

(58) Field of Classification Search
CPC ......... B60W 2510/20; B60W 2520/14; B60W 30/045; B60W 2540/18; B60W 2710/1055; B60T 8/1755
USPC .......................................................... 701/41
See application file for complete search history.

(56) References Cited

U.S. PATENT DOCUMENTS

| 5,020,619 | A | * | 6/1991 | Kanazawa | B62D 7/159 180/412 |
| 5,082,076 | A | * | 1/1992 | Oshita | B62D 5/049 180/404 |
| 6,949,901 | B1 | * | 9/2005 | Collier-Hallman | B62D 6/002 180/443 |
| 8,433,493 | B2 | | 4/2013 | Takahashi et al. | |
| 8,538,653 | B2 | | 9/2013 | Miyajima et al. | |
| 8,676,464 | B2 | | 3/2014 | Shimura et al. | |
| 8,694,208 | B2 | * | 4/2014 | Yokota | B60T 8/17554 180/9.38 |
| 8,880,293 | B2 | | 11/2014 | Hirao et al. | |
| 8,903,609 | B2 | * | 12/2014 | Kim | B62D 5/0409 180/422 |
| 8,930,061 | B2 | * | 1/2015 | Ammon | B60T 8/17555 701/29.2 |
| 8,977,464 | B1 | | 3/2015 | Takahashi et al. | |
| 8,989,981 | B2 | | 3/2015 | Yamakado et al. | |

(Continued)

FOREIGN PATENT DOCUMENTS

| EP | 2 712 780 A1 | 4/2014 |
| EP | 2 712 782 A1 | 4/2014 |

(Continued)

*Primary Examiner* — Angelina Shudy
(74) *Attorney, Agent, or Firm* — Studebaker & Brackett PC

(57) ABSTRACT

The vehicle behavior control device is designed to control a behavior of a vehicle having steerable front road wheels. The vehicle behavior control device comprises a PCM configured to perform control to reduce a driving force for the vehicle according to a steering speed of the vehicle, wherein the PCM is operable to reduce a change rate during increasing of a reduction amount of the driving force according to the steering speed of the vehicle, to a smaller value, as a steering wheel angle of the vehicle becomes larger.

4 Claims, 5 Drawing Sheets

(56) References Cited

U.S. PATENT DOCUMENTS

| | | |
|---|---|---|
| 9,043,116 B2 | 5/2015 | Takahashi et al. |
| 9,086,427 B2 | 7/2015 | Maeda et al. |
| 9,139,107 B2 | 9/2015 | Kageyama et al. |
| 9,211,875 B2 | 12/2015 | Harada |
| 9,296,374 B2 | 3/2016 | Yamakado et al. |
| 9,346,486 B2 * | 5/2016 | Itamoto .................. B62D 5/049 |
| 9,352,747 B2 | 5/2016 | Nagatsuka et al. |
| 9,376,108 B2 * | 6/2016 | Fairgrieve ................ B60T 7/22 |
| 9,499,196 B2 * | 11/2016 | Kariatsumari ....... B62D 5/0472 |
| 9,744,967 B2 * | 8/2017 | Umetsu ............. B60W 30/045 |
| 9,834,110 B2 * | 12/2017 | Nobumoto .......... B60L 11/1861 |
| 9,889,846 B2 * | 2/2018 | Sunahara ............ B60W 30/045 |
| 9,916,699 B2 * | 3/2018 | Chundrlik, Jr. ... B60W 50/0098 |
| 2001/0052756 A1 * | 12/2001 | Noro .................... B62D 5/0463 318/432 |
| 2002/0007236 A1 * | 1/2002 | Sadano .................. B62D 1/28 701/28 |
| 2003/0120407 A1 * | 6/2003 | Itoh ..................... B62D 5/0484 701/43 |
| 2004/0088097 A1 * | 5/2004 | Fujinami .................. B60T 7/22 701/70 |
| 2005/0065697 A1 * | 3/2005 | Niino ................... B60T 8/1755 701/71 |
| 2005/0171669 A1 * | 8/2005 | Sato ................... B60W 30/188 701/51 |
| 2005/0236894 A1 * | 10/2005 | Lu ....................... B60T 8/1755 303/139 |
| 2006/0060399 A1 * | 3/2006 | Tabata ................. B60K 6/442 180/65.23 |
| 2006/0076828 A1 * | 4/2006 | Lu ....................... B60T 8/1755 303/146 |
| 2006/0129300 A1 * | 6/2006 | Ishimoto ............... B60T 8/1755 701/72 |
| 2006/0287790 A1 * | 12/2006 | Seifert .................. B60G 17/06 701/37 |
| 2007/0239340 A1 * | 10/2007 | Miura .................. B60W 10/04 701/70 |
| 2008/0035411 A1 * | 2/2008 | Yamashita ............. B62D 5/046 180/443 |
| 2008/0082243 A1 * | 4/2008 | Villella .............. B60K 17/3462 701/70 |
| 2009/0037064 A1 * | 2/2009 | Nakamura ............ B60T 8/1755 701/70 |
| 2009/0248249 A1 * | 10/2009 | Park ...................... B60T 8/1755 701/42 |
| 2009/0255746 A1 * | 10/2009 | Boesch .................. B60K 6/365 180/197 |
| 2011/0015828 A1 * | 1/2011 | Shimizu ............... B62D 5/0481 701/43 |
| 2011/0060505 A1 * | 3/2011 | Suzuki ...................... B60T 7/12 701/42 |
| 2011/0125368 A1 * | 5/2011 | Yokota ................ B60T 8/17554 701/41 |
| 2011/0202250 A1 | 8/2011 | Miyajima et al. |
| 2012/0053791 A1 | 3/2012 | Harada |
| 2012/0185132 A1 * | 7/2012 | Kezobo ................ B62D 5/0472 701/41 |
| 2012/0185142 A1 * | 7/2012 | Meyers ............... B60W 30/045 701/70 |
| 2012/0209489 A1 | 8/2012 | Saito et al. |
| 2012/0277965 A1 | 11/2012 | Takahashi et al. |
| 2012/0316744 A1 | 12/2012 | Shimura et al. |
| 2013/0041541 A1 * | 2/2013 | Kageyama .......... B60L 15/2036 701/22 |
| 2013/0079988 A1 | 3/2013 | Hirao et al. |
| 2013/0110332 A1 * | 5/2013 | Hwang ............... B60L 15/2036 701/22 |
| 2013/0261922 A1 * | 10/2013 | Takeya .................. B60T 8/1755 701/72 |
| 2013/0345901 A1 | 12/2013 | Maeda et al. |
| 2014/0222309 A1 | 8/2014 | Yamakado et al. |
| 2015/0094924 A1 | 4/2015 | Takahashi et al. |
| 2015/0094927 A1 | 4/2015 | Takahashi et al. |
| 2015/0120121 A1 | 4/2015 | Nobumoto et al. |
| 2015/0151725 A1 * | 6/2015 | Clarke .................. B60W 30/00 701/28 |
| 2015/0151747 A1 * | 6/2015 | Fairgrieve ................. B60T 7/22 701/91 |
| 2015/0166025 A1 | 6/2015 | Nagatsuka et al. |
| 2015/0239442 A1 | 8/2015 | Yamakado et al. |
| 2015/0298696 A1 | 10/2015 | Nagatsuka et al. |
| 2015/0321669 A1 | 11/2015 | Inou et al. |
| 2015/0329108 A1 * | 11/2015 | Kodaira .............. B62D 15/025 701/41 |
| 2015/0352956 A1 * | 12/2015 | Miuchi .................. B60K 35/00 701/41 |
| 2015/0367852 A1 | 12/2015 | Nagatsuka et al. |
| 2016/0059852 A1 | 3/2016 | Yamakado et al. |
| 2016/0207509 A1 * | 7/2016 | Kida ...................... G08G 1/166 |
| 2016/0244038 A1 | 8/2016 | Yamakado et al. |
| 2017/0087986 A1 * | 3/2017 | Ujihara ................. B60K 28/16 |
| 2017/0089281 A1 * | 3/2017 | Ujihara ............... B60W 30/045 |
| 2017/0129479 A1 * | 5/2017 | Sunahara ............ B60W 30/045 |
| 2017/0129480 A1 * | 5/2017 | Sunahara ............ B60W 30/045 |
| 2017/0129481 A1 * | 5/2017 | Umetsu .............. B60W 30/045 |
| 2017/0175659 A1 * | 6/2017 | Sunahara .............. F02D 41/107 |
| 2017/0234210 A1 * | 8/2017 | Ohisa .................. F02D 41/0007 60/600 |
| 2017/0234247 A1 * | 8/2017 | Ohisa ...................... F02P 5/1516 701/103 |
| 2017/0254278 A1 * | 9/2017 | Ohisa ...................... F02D 11/02 |
| 2017/0254281 A1 * | 9/2017 | Ohisa ........................ F02D 9/02 |
| 2017/0282972 A1 * | 10/2017 | Moretti ............. B62D 15/0265 |
| 2018/0001888 A1 * | 1/2018 | Takahara ............ B60W 30/045 |
| 2018/0057004 A1 * | 3/2018 | Muldoon ............... B60W 10/06 |
| 2018/0066625 A1 * | 3/2018 | Hiwatashi ................ F01N 3/10 |
| 2018/0072317 A1 * | 3/2018 | Hiwatashi ............ F02D 41/021 |
| 2018/0079406 A1 * | 3/2018 | Izumi .................. B60W 30/025 |
| 2018/0079407 A1 * | 3/2018 | Izumi .................. B60W 30/025 |
| 2018/0086349 A1 * | 3/2018 | Hiwatashi .......... B60W 40/105 |
| 2018/0237004 A1 * | 8/2018 | Nasu .................. B60W 30/045 |
| 2018/0273024 A1 * | 9/2018 | Umetsu ................ B60W 30/02 |

FOREIGN PATENT DOCUMENTS

| | | |
|---|---|---|
| JP | 2679703 B2 * | 11/1997 |
| JP | 2011-088576 A | 5/2011 |
| JP | 2014-166014 A | 9/2014 |
| JP | 2015-085820 A | 5/2015 |
| JP | 2015-085823 A | 5/2015 |
| JP | 2015-089251 A | 5/2015 |
| JP | 2015-089252 A | 5/2015 |
| JP | 2015-182752 A | 10/2015 |
| JP | 2016-039750 A | 3/2016 |
| JP | 2016-039751 A | 3/2016 |
| WO | 2012/042935 A1 | 4/2012 |
| WO | 2014/054432 A1 | 4/2014 |
| WO | 2014/119171 A1 | 8/2014 |
| WO | 2016/020718 A1 | 2/2016 |

* cited by examiner

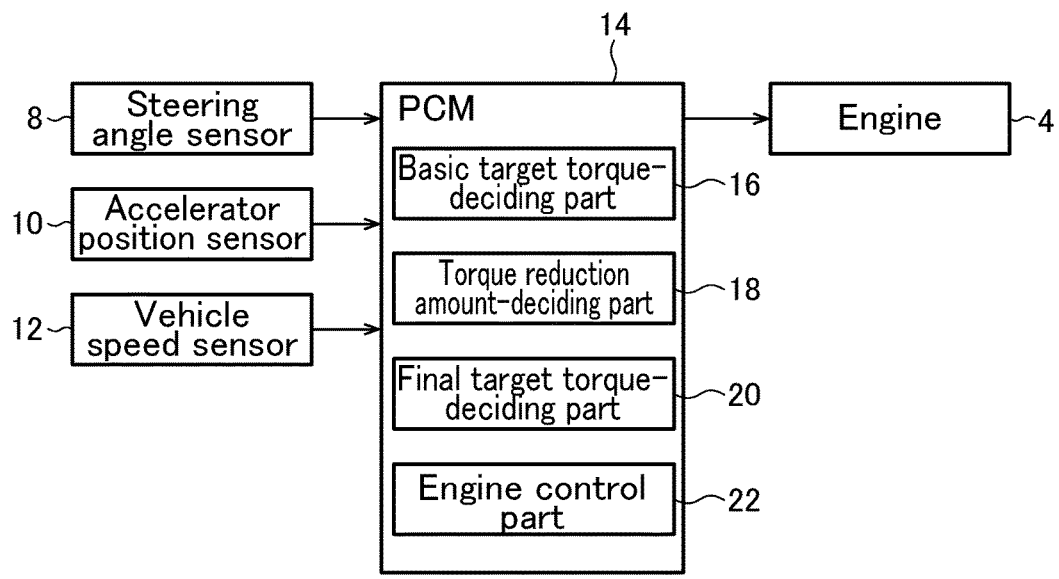
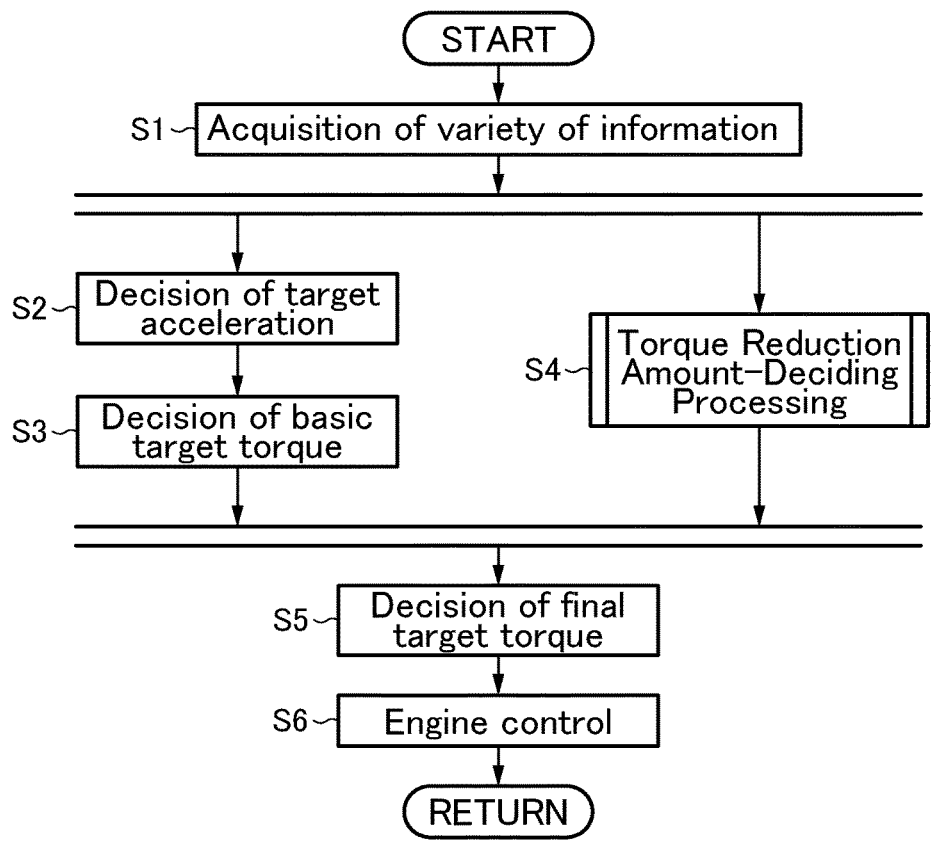

VEHICLE BEHAVIOR CONTROL DEVICE

TECHNICAL FIELD

The present invention relates to a vehicle behavior control device, and more particularly to a vehicle behavior control device for controlling a behavior of a vehicle having steerable front road wheels.

BACKGROUND ART

Heretofore, there has been known a control system capable of, in a situation where a behavior of a vehicle becomes unstable due to road wheel slip or the like, controlling the vehicle behavior to enable a safe traveling (e.g., an antiskid brake system). Specifically, there has been known a control system operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust a load to be applied to front road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see, for example, the following Patent Document 1).

Further, there has been proposed a vehicle behavior control device operable to reduce a driving force for a vehicle according to a yaw rate-related quantity corresponding to a steering wheel operation of a driver (e.g., yaw acceleration), thereby making it possible to quickly generate a vehicle deceleration in response to start of the steering wheel operation by the driver and thus quickly apply a sufficient load to front road wheels as steerable road wheels (see, for example, the following Patent Document 2). In this vehicle behavior control device, in response to start of the steering wheel operation, a load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsiveness to a turning operation of a steering wheel. This makes it possible to realize a vehicle behavior as intended by the driver.

CITATION LIST

Patent Document

Patent Document 1: JP 2011-88576A
Patent Document 2: JP 2014-166014A

SUMMARY OF INVENTION

Technical Problem

Meanwhile, when a vehicle travels along a double apex curve having a curvature radius which gradually decreases as the vehicle travels forwardly toward a far side of the curve, or the like, after turning a steering wheel and keeping a steering wheel angle thereof constant, a driver needs to further perform an operation of additionally turning the steering wheel, in some cases. If, in response to start of the additional turning operation, a deceleration is generated in the vehicle, at the same level as that in an initial phase after entering the curve from a straight road, a longitudinal load is additionally applied to front road wheels already applied with a lateral load, to cause a further increase in cornering force of the front road wheels, thereby providing an excessively improved turn-in ability of the vehicle, so that the driver is likely to sensitively recognize a vehicle behavior responsive to the additional turning operation of the steering wheel.

The present invention has been made to solve the above conventional problem, and an object thereof is to provide a vehicle behavior control device capable of performing a vehicle behavior control to accurately realize a vehicle behavior as intended by a driver, without giving any uncomfortable feeling to the driver in regard to a vehicle behavior responsive to an operation of additionally turning a steering wheel during vehicle turning.

Solution to Technical Problem

In order to achieve the above object, the present invention provides a vehicle behavior control device for controlling a behavior of a vehicle having steerable front road wheels. The vehicle behavior control device comprises driving force control means configured to perform control to reduce a driving force for the vehicle according to a yaw rate-related quantity of the vehicle, wherein the driving force control means is operable to reduce a change rate during increasing of a reduction amount of the driving force according to the yaw rate-related quantity of the vehicle, to a smaller value, as a steering wheel angle of a steering wheel of the vehicle becomes larger.

In the vehicle behavior control device of the present invention having the above feature, the driving force control means is operable to reduce a change rate during increasing of the reduction amount of the driving force according to the yaw rate-related quantity, to a smaller value, as the steering wheel angle becomes larger, so that it becomes possible to reduce a change rate of a deceleration to be added to the vehicle based on the reduction in the driving force, to a smaller value, as the steering wheel angle becomes larger, and thus allow an increase in cornering force based on an increase in load on the front road wheels to become gentle. This makes it possible to prevent the turn-in ability of the vehicle from being excessively improved in response to an operation of additionally turning the steering wheel during vehicle turning, and thus perform a vehicle behavior control to accurately realize a vehicle behavior as intended by a driver, without giving any uncomfortable feeling to a driver in regard to a vehicle behavior responsive to the additional turning operation.

Preferably, in the vehicle behavior control device of the present invention, the driving force control means is operable, when the steering wheel angle is increasing, to reduce the driving force according to the yaw rate-related quantity.

According to this feature, the driving force control means is operable, when the steering wheel angle is increasing, to reduce the driving force according to the yaw rate-related quantity, so that it becomes possible to, in response to start of a steering wheel operation, quickly apply a load to the front road wheels according to the yaw rate-related quantity, while avoiding giving an uncomfortable feeling to a driver in regard to a vehicle behavior responsive to the additional turning operation, thereby providing an improved responsiveness to a steering wheel turning operation, and performing a vehicle behavior control to accurately realize a vehicle behavior as intended by the driver.

Preferably, in the vehicle behavior control device of the present invention, the driving force control means is operable to decide a target additional deceleration to be added to the vehicle, according to the yaw rate-related quantity of the vehicle, and reduce the driving force for the vehicle so as to realize the target additional deceleration, and to reduce a change rate during increasing of the target additional deceleration, to a smaller value, as the steering wheel angle becomes larger.

According to this feature, it becomes possible to reduce a change rate of a deceleration to be added to the vehicle, to a smaller value, as the steering wheel angle becomes larger, to thereby reduce the driving force so as to allow an increase in cornering force based on an increase in load on the front road wheels to become gentle. This makes it possible to reliably prevent the turn-in ability of the vehicle from being excessively improved in response to the operation of additionally turning the steering wheel during vehicle turning, and thus perform the vehicle behavior control to accurately realize a vehicle behavior as intended by a driver, without giving any uncomfortable feeling to a driver in regard to a vehicle behavior responsive to the additional turning operation.

Effect of Invention

The vehicle behavior control device of the present invention can perform a vehicle behavior control to accurately realize a vehicle behavior as intended by a driver, without giving any uncomfortable feeling to the driver in regard to a vehicle behavior responsive to the operation of additionally turning the steering wheel during vehicle turning.

BRIEF DESCRIPTION OF DRAWINGS

FIG. 2 is a block diagram depicting an electrical configuration of the vehicle behavior control device according to this embodiment.

FIG. 3 is a flowchart depicting engine control processing to be performed by the vehicle behavior control device according to this embodiment, so as to control an engine.

FIGS. 7A to 7G are diagrams depicting a temporal change of each parameter pertaining to engine control to be performed by the vehicle behavior control device according to this embodiment during turning of a vehicle equipped with the vehicle behavior control device, wherein: FIG. 7A is a top plan view schematically depicting the vehicle which is turning in a clockwise direction; FIG. 7B is a diagram depicting a change in steering wheel angle of the vehicle which is turning in the clockwise direction as depicted in FIG. 7A; FIG. 7C is a diagram depicting a change in steering speed of the vehicle which is turning in the clockwise direction as depicted in FIG. 7A; FIG. 7D is a diagram depicting a change in additional deceleration decided based on the steering speed depicted in FIG. 7C; FIG. 7E is a diagram depicting a change in torque reduction amount decided based on the additional deceleration depicted in FIG. 7D; FIG. 7F is a diagram depicting a change in final target torque decided based on a basic target torque and the torque reduction amount; and FIG. 7G is a diagram depicting a change in yaw rate (actual yaw rate) generated in the vehicle when the engine control is performed based on the final target torque depicted in FIG. 7F, and a change in actual yaw rate generated in the vehicle when the engine control based on the torque reduction amount decided by a torque reduction amount-deciding section is not performed.

DESCRIPTION OF EMBODIMENTS

With reference to the accompanying drawings, a vehicle behavior control device according to one embodiment of the present invention will now be described.

Figure 1:
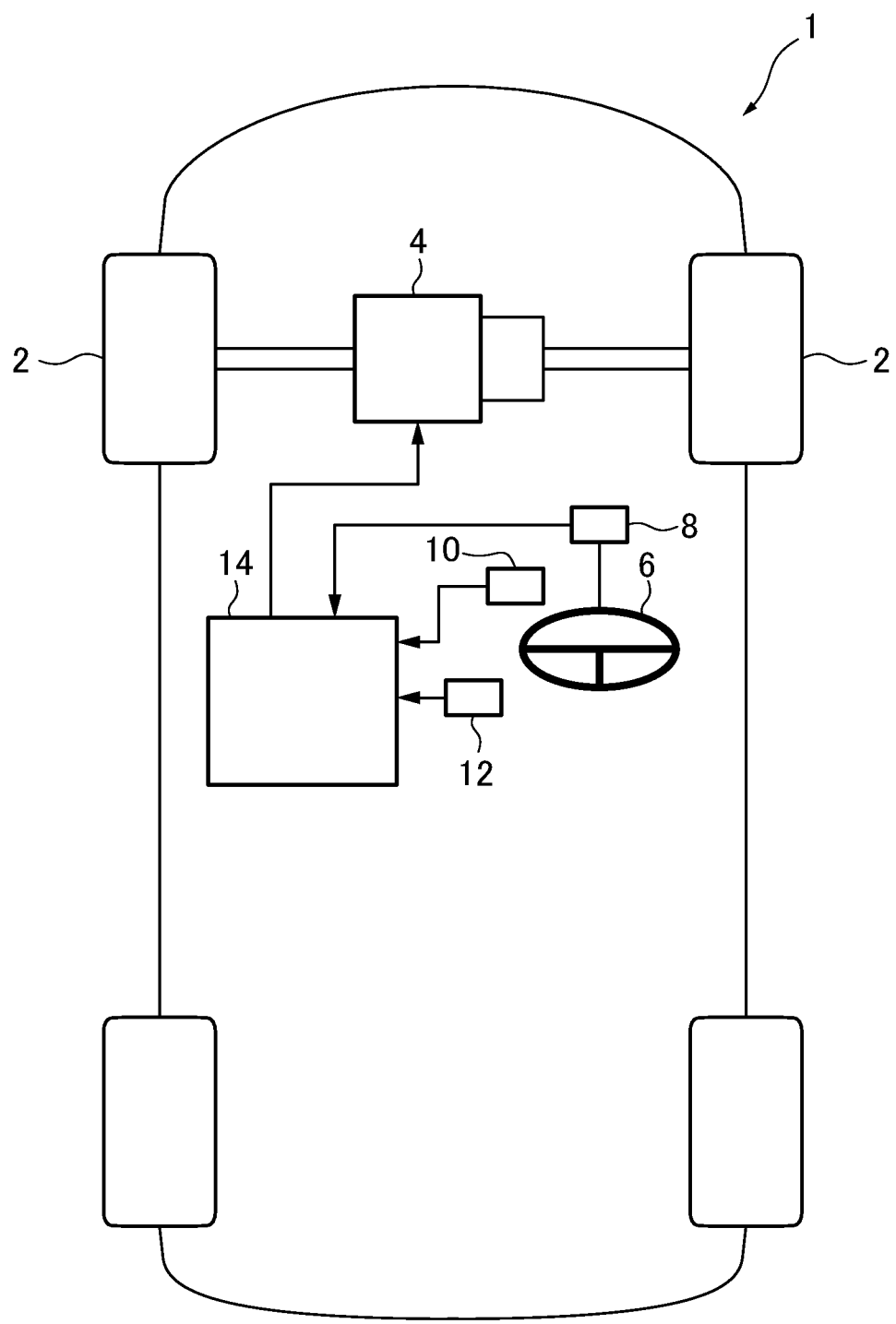
FIG. 1 is a block diagram depicting an entire configuration of a vehicle equipped with a vehicle behavior control device according to one embodiment of the present invention.

First of all, with reference to FIG. 1, a vehicle equipped with the vehicle behavior control device according to this embodiment will be described. FIG. 1 is a block diagram depicting an entire configuration of the vehicle equipped with the vehicle behavior control device according to this embodiment.

In FIG. 1, the reference sign 1 denotes the vehicle equipped with the vehicle behavior control device according to this embodiment. A vehicle body of the vehicle 1 has a front portion on which an engine 4 for driving drive road wheels (in the vehicle depicted in FIG. 1, right and left front road wheels 2) is mounted. The engine 4 is an internal combustion engine such as a gasoline engine or a diesel engine.

The vehicle 1 has: a steering wheel angle sensor 8 for detecting a rotational angle of a steering wheel 6 (steering wheel angle); an accelerator position sensor 10 for detecting an amount of depression of an accelerator pedal (accelerator position); and a vehicle speed sensor 12 for detecting a vehicle speed. Each of the above sensors is operable to output a detection value to a PCM (Power-train Control Module) 14.

Next, with reference to FIG. 2, an electrical configuration of the vehicle behavior control device according to this embodiment will be described. FIG. 2 is a block diagram depicting the electrical configuration of the vehicle behavior control device according to this embodiment.

The PCM 14 (vehicle behavior control device) according to this embodiment is configured to, based on detection signals output from the above sensors 8 to 12, and detection signals output from various other sensors for detecting an operating state of the engine 4, generate and output control signals to perform controls with respect to various components (e.g., a throttle valve, a turbocharger, a variable valve mechanism, an ignition unit, a fuel injection valve, and an EGR unit) of the engine 4.

The PCM 14 comprises: a basic target torque-deciding section 16 for deciding a basic target torque based on a driving state of the vehicle 1 including an accelerator pedal operation; a torque reduction amount-deciding section 18 for deciding a torque reduction amount for adding a deceleration to the vehicle 1 based on a yaw rate-related quantity of the vehicle 1; a final target torque-deciding section 20 for deciding a final target torque based on the basic target torque and the torque reduction amount; and an engine control section 22 for controlling the engine 4 to cause the engine 4 to output the final target torque. This embodiment will be described based on an assumption that the torque reduction amount-deciding section 18 is configured to use steering speed of the vehicle 1 as the yaw rate-related quantity.

The above components of the PCM 14 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Next, with reference to FIGS. 3 to 6, processing to be performed by the vehicle behavior control device will be described.

Figure 4:
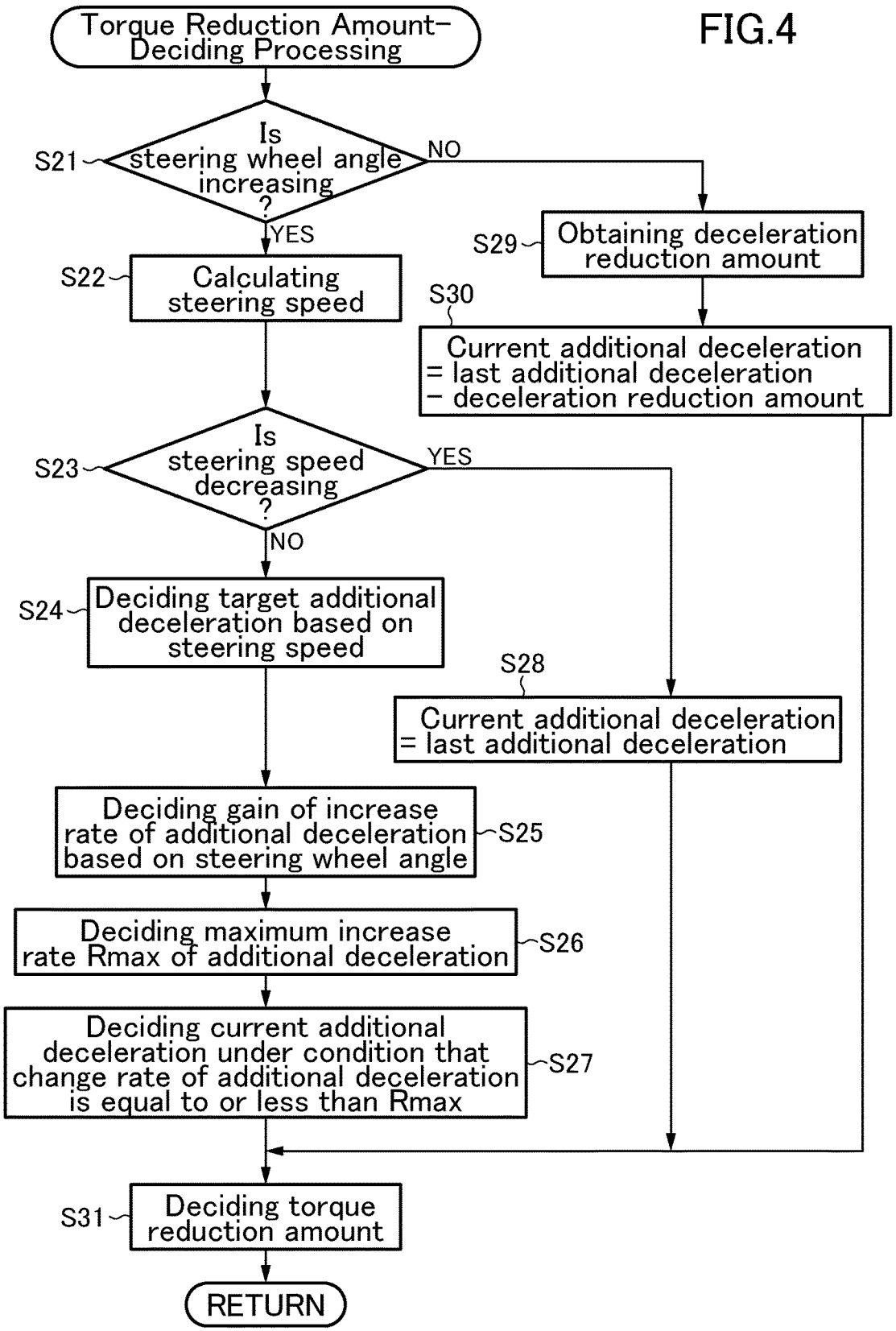
FIG. 4 is a flowchart depicting torque reduction amount-deciding processing to be performed by the vehicle behavior control device according to this embodiment, so as to decide a torque reduction amount.
Figure 5:
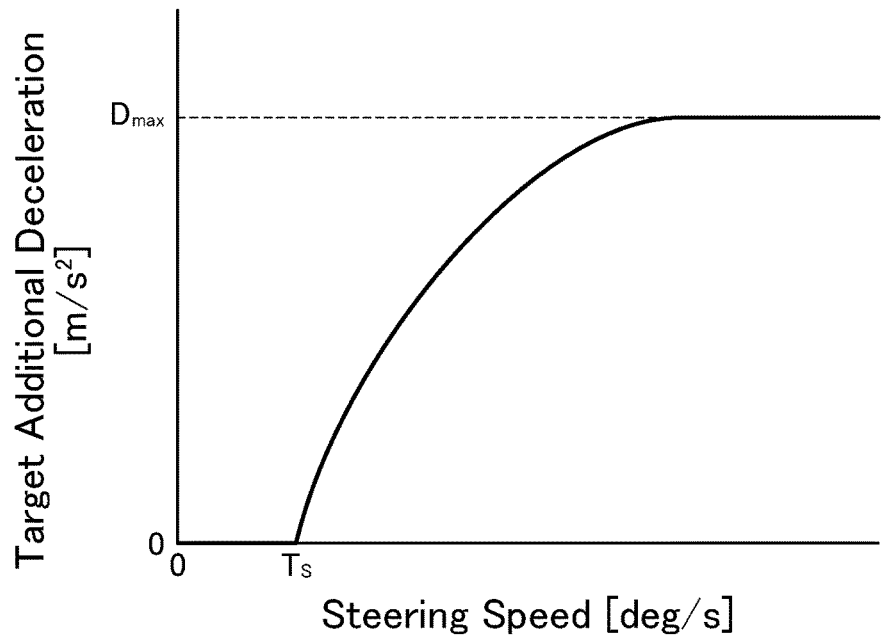
FIG. 5 is a map depicting a relationship between a steering speed, and a target additional deceleration to be decided by the vehicle behavior control device according to this embodiment.
Figure 6:
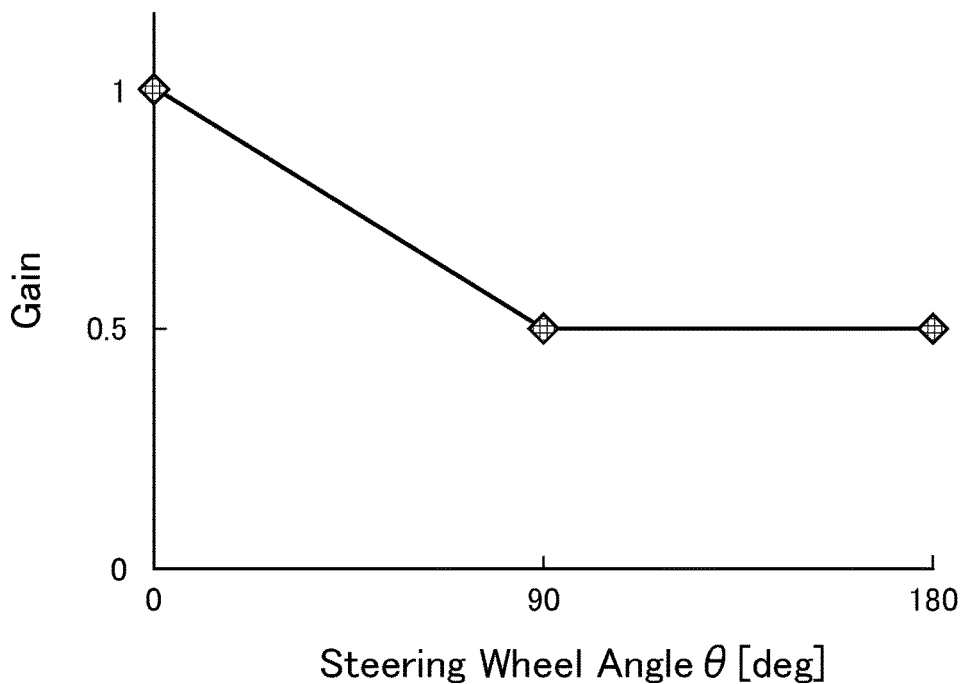
FIG. 6 is a map depicting a relationship between a steering wheel angle, and a gain of an increase rate of an additional deceleration to be decided by the vehicle behavior control device according to this embodiment.

FIG. 3 is a flowchart depicting engine control processing to be performed by the vehicle behavior control device according to this embodiment, so as to control the engine 4, and FIG. 4 is a flowchart depicting torque reduction amount-deciding processing to be performed by the vehicle behavior control device according to this embodiment, so as to decide the torque reduction amount. FIG. 5 is a map depicting a relationship between the steering speed, and a target additional deceleration to be decided by the vehicle behavior control device according to this embodiment, and FIG. 6 is a map depicting a relationship between a steering wheel angle, and a gain of an increase rate of an additional deceleration to be decided by the vehicle behavior control device according to this embodiment.

The engine control processing in FIG. 3 is activated when an ignition switch of the vehicle 1 is turned on to apply power to the vehicle behavior control device, and repeatedly executed with a given cycle period.

As depicted in FIG. 3, upon start of the engine control processing, in step S1, the PCM 14 operates to acquire a variety of information about the driving state of the vehicle 1. Specifically, the PCM 14 operates to acquire, as information about the driving state, detection signals output from the aforementioned sensors, including the steering wheel angle detected by the steering wheel angle sensor 8, the accelerator position detected by the accelerator position sensor 10, the vehicle speed detected by the vehicle speed sensor 12, and a gear stage currently set in a transmission of the vehicle 1.

Subsequently, in step S2, the basic target torque-deciding section 16 of the PCM 14 operates to set a target acceleration based on the driving state of the vehicle 1 including the accelerator pedal operation, acquired in the step S1. Specifically, the basic target torque-deciding section 16 operates to select, from a plurality of acceleration characteristic maps defined with respect to various vehicle speeds and various gear stages (the maps are preliminarily created and stored in a memory or the like), one acceleration characteristic map corresponding to a current vehicle speed and a current gear stage, and decide a target acceleration corresponding to a current accelerator position, with reference to the selected acceleration characteristic map.

Subsequently, in step S3, the basic target torque-deciding section 16 operates to decide the basic target torque of the engine 4 for realizing the target acceleration decided in the step S2. In this embodiment, the basic target torque-deciding section 16 operates to decide the basic target torque within a torque range outputtable by the engine 4, based on current vehicle speed, gear stage, road grade, road surface mu ($\mu$), etc.

In parallel to the processing in the steps S2 and S3, in step S4, the torque reduction amount-deciding section 18 operates to perform the torque reduction amount-deciding processing of deciding the torque reduction amount for adding a deceleration to the vehicle 1, based on a steering wheel operation. This torque reduction amount-deciding processing will be described with reference to FIG. 4.

As depicted in FIG. 4, upon start of the torque reduction amount-deciding processing, in step S21, the torque reduction amount-deciding section 18 operates to determine whether or not an absolute value of the steering wheel angle acquired in the step S1 is increasing. As a result, when the absolute value of the steering wheel angle is increasing, the subroutine proceeds to step S22. In the step S22, the torque reduction amount-deciding section 18 operates to calculate the steering speed as the yaw rate-related quantity, based on the steering wheel angle acquired in the step S1.

Subsequently, in step S23, the torque reduction amount-deciding section 18 operates to determine whether an absolute value of the calculated steering speed is decreasing.

As a result, when the absolute value of the calculated steering speed is not decreasing, i.e., the absolute value of the calculated steering speed is increasing or the absolute value of the steering speed does not change, the subroutine proceeds to step S24. In the step S24, the torque reduction amount-deciding section 18 operates to decide the target additional deceleration based on the calculated steering speed. This target additional deceleration is a deceleration to be added to the vehicle 1 according to the steering wheel operation in order to accurately realize a vehicle behavior which is intended by a driver.

Specifically, the torque reduction amount-deciding section 18 operates to obtain a value of the target additional deceleration corresponding to the steering speed calculated in the step S22, based on a relationship between the target additional deceleration and the steering speed, represented by the map in FIG. 5.

In FIG. 5, the horizontal axis denotes the steering speed, and the vertical axis denotes the target additional deceleration. As depicted in FIG. 5, when the steering speed is equal to or less than a threshold $T_S$, a corresponding value of the target additional deceleration is 0. That is, when the steering speed is equal to or less than the threshold $T_S$, the PCM 14 operates to stop control of adding a deceleration to the vehicle 1 (specifically, reduce an output torque of the engine 4) based on the steering wheel operation.

On the other hand, when the steering speed is greater than the threshold $T_S$, as the steering speed is increased to a higher value, a value of the target additional deceleration corresponding to the steering speed comes closer to a given upper limit value $D_{max}$ (e.g., 1 m/s$^2$). That is, as the steering speed is increased to a higher value, the target additional deceleration is increased to a larger value, and a rate of increase of the target additional deceleration becomes smaller.

Subsequently, in step S25, the torque reduction amount-deciding section 18 operates to, based on the steering wheel angle, decide a gain of a change rate (increase rate) during increasing of the additional deceleration in the control of adding a deceleration to the vehicle 1 according to the steering wheel operation.

Specifically, the torque reduction amount-deciding section 18 operates to obtain a value of the gain corresponding to a value of the steering wheel angle obtained in the step S1, based on the relationship between the steering wheel angle, and the gain of the increase rate of the additional deceleration, depicted in the map of FIG. 6.

FIG. 6 is the map depicting the relationship between the steering wheel angle, and the gain of the increase rate of the additional deceleration. In FIG. 6, the horizontal axis represents the steering wheel angle, and the vertical axis represents the gain. As depicted in FIG. 6, when the steering wheel angle is less than 90°, the gain becomes smaller as the steering wheel angle becomes larger. On the other hand, when the steering wheel angle is equal to or greater than 90°, the gain is set to a constant minimum value of 0.5. Further, when the steering wheel angle is 0°, the gain has a maximum value of 1.

Returning to FIG. 4, in step S26, the torque reduction amount-deciding section 18 operates to decide a maximum increase rate of the additional deceleration in the control of adding a deceleration to the vehicle 1 in a current processing cycle.

Specifically, the torque reduction amount-deciding section 18 operates to decide a maximum increase rate Rmax of the additional deceleration in the current processing cycle, by multiplying a basis increase rate (e.g., 0.25 m/s$^3$) preliminarily stored in a memory or the like by the gain decided in the step S25.

Subsequently, in step S27, the torque reduction amount-deciding section 18 operates to decide an additional deceleration in the current processing cycle under a condition that the increase rate of the additional deceleration is equal to or less than the $R_{max}$.

Specifically, the torque reduction amount-deciding section 18 operates to, when an increase rate from a value of the additional deceleration decided in the last processing cycle to a value of the target additional deceleration decided in the step S24 in the current processing cycle is equal to or less than the $R_{max}$ decided in the step S26, decide the value of the target additional deceleration decided in the step S24, as a value of the additional deceleration in the current processing cycle.

On the other hand, the torque reduction amount-deciding section 18 operates to, when the increase rate from the value of the additional deceleration decided in the last processing cycle to the value of the target additional deceleration decided in the step S24 in the current processing cycle is greater than the $R_{max}$, decide, as the value of the additional deceleration in the current processing cycle, a value obtained by increasing the value of the additional deceleration decided in the last processing cycle, at the increase rate the $R_{max}$ for the given cycle period.

Referring to the step S23 again, when the absolute value of the steering speed is decreasing, the subroutine proceeds to step S28. In the step S28, the torque reduction amount-deciding section 18 operates to decide the value of the additional deceleration decided in the last processing cycle, as the value of the additional deceleration in the current processing cycle. That is, when the absolute value of the steering speed is decreasing, a value of the additional deceleration corresponding to a maximum value of the steering speed (i.e., a maximum value of the additional deceleration) is maintained.

Referring to the step S21 again, when the absolute value of the steering wheel angle is not increasing (is maintained constant or is decreasing), the subroutine proceeds to step S29. In the step S29, the torque reduction amount-deciding section 18 operates to obtain an amount (deceleration reduction amount) by which the value of the additional deceleration decided in the last processing cycle is to be reduced in the current processing cycle. In one example, the deceleration reduction amount may be calculated based on a constant reduction rate (e.g., 0.3 m/s$^3$) preliminarily stored in a memory or the like. In another example, the deceleration reduction amount may be calculated based on a reduction rate decided according to the driving state of the vehicle 1 acquired in the step S1 and/or the steering speed calculated in the step S22.

Subsequently, in step S30, the torque reduction amount-deciding section 18 operates to subtract a value of the deceleration reduction amount obtained in the step S29 from the value of the additional deceleration decided in the last processing cycle, to thereby decide the additional deceleration in the current processing cycle.

After completion of the step S27, S28 or S30, in step S31, the torque reduction amount-deciding section 18 operates to decide the torque reduction amount, based on the current additional deceleration decided in the step S27, S28 or S30. Specifically, the torque reduction amount-deciding section 18 operates to decide a value of the torque reduction amount required for realizing the current additional deceleration, based on the current vehicle speed, gear stage, road gradient and others acquired in the Step S1. After completion of the step S31, the torque reduction amount-deciding section 18 operates to terminate the torque reduction amount-deciding processing, and the engine control processing routine returns to the main routine.

Returning to FIG. 3, after performing the processing in the steps S2 and S3 and the torque reduction amount-deciding processing in the step S4, in step S5, the final target torque-deciding section 20 operates to subtract a value of the torque reduction amount decided by the torque reduction amount-deciding processing in the step S4, from a value of a basic target torque after being subjected to smoothing in the step S3, to thereby decide the final target torque.

Subsequently, in step S6, the engine control section 22 operates to control the engine 4 to cause the engine 4 to output the final target torque set in the step S5. Specifically, the engine control section 22 operates to, based on the final target torque set in the step S5 and an engine speed, decide various engine state amounts (e.g., air charge amount, fuel injection amount, intake-air temperature, and oxygen concentration) required for realizing the final target torque set in the step S5, and then, based on the decided state amounts, control a plurality of actuators for driving various components of the engine 4. In this case, the engine control section 22 operates to perform engine control in such a manner as to set a limit value or range with respect to each of the state amounts, and set a controlled variable of each actuator to allow its related state amount to preserve limitation by the limit value or range.

After completion of the step S6, the PCM 14 operates to terminate the engine control processing.

Next, with reference to FIGS. 7A to 7G, an operation of the vehicle behavior control device according to this embodiment will be described. FIGS. 7A to 7G are diagrams depicting a temporal change of each parameter pertaining to the engine control to be performed by the vehicle behavior control device according to this embodiment during turning of the vehicle 1 equipped with the vehicle behavior control device.

Figure 7A:
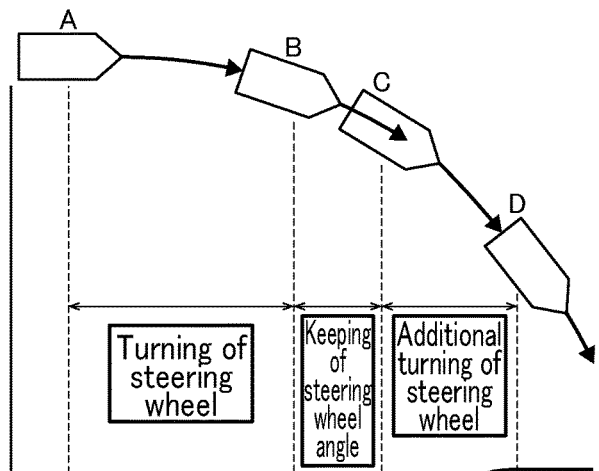

FIG. 7A is a top plan view schematically depicting the vehicle 1 which is turning in a clockwise direction. As depicted in FIG. 7A, in response to a turning operation of the steering wheel performed from a position A, the vehicle 1 starts to turn in a clockwise direction, and then the clockwise turning is continued from a position B to a position C, while the steering wheel angle is kept constant. Then, in response to an additional turning operation of the steering wheel performed from the position C, the vehicle 1 turns with a smaller turning radius in the clockwise direction.

Figure 7B:

FIG. 7B is a diagram depicting a change in steering wheel angle of the vehicle 1 which is turning in the clockwise direction as depicted in FIG. 7A. In FIG. 7B, the horizontal axis represents the time, and the vertical axis represents the steering wheel angle (the angle in the clockwise direction has a positive value).

As depicted in FIG. 7B, clockwise steering is started at the position A, and then, along with the turning operation of the steering wheel, a clockwise steering wheel angle gradually increases (turning of the steering wheel). Then, the steering wheel angle is kept constant from the position B to the position C (keeping of the steering wheel angle). Then, along with the additional turning operation of the steering wheel, the clockwise steering wheel angle further increases from the position C to a position D (additional turning of the steering wheel), and reaches a maximum value at the position D.

Figure 7C:
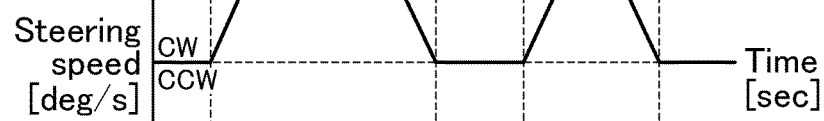

FIG. 7C is a diagram depicting a change in steering speed of the vehicle 1 which is turning in the clockwise direction as depicted in FIG. 7A. In FIG. 7C, the horizontal axis represents the time, and the vertical axis represents the steering speed.

The steering speed of the vehicle 1 is expressed as a temporal differentiation of the steering wheel angle of the vehicle 1. That is, as depicted in FIG. 7C, when clockwise steering is started at the position A, a clockwise steering speed arises and is maintained approximately constant in an intermediate zone between the position A and the position B. Then, when the clockwise steering speed decreases and the clockwise steering wheel angle becomes constant at the position B, the steering speed becomes 0. After this, the steering speed is kept at 0 during a period in which the clockwise steering wheel angle is kept constant from the position B to the position C.

Subsequently, when the clockwise additional steering wheel turning operation is started at the position C, the clockwise steering speed arises and is maintained approximately constant in an intermediate zone between the position C and the position D. Then, the clockwise steering speed decreases, and, when the clockwise steering wheel angle has the maximum value at the position D, the clockwise steering speed becomes 0.

Figure 7D:
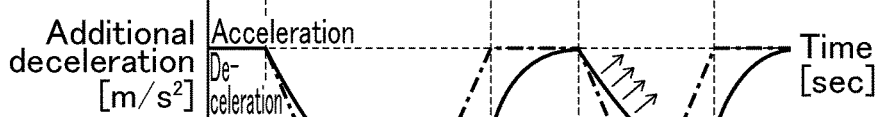

FIG. 7D is a diagram depicting a change in the additional deceleration decided based on the steering speed depicted in FIG. 7C. In FIG. 7D, the horizontal axis represents the time, and the vertical axis represents the additional deceleration. In FIG. 7D, the solid line indicates a change in the additional deceleration decided in the torque reduction amount-deciding processing in FIG. 4, and the one-dot chain line indicates a change in the target additional deceleration based on the steering speed. As with the change in the steering speed depicted in FIG. 7C, the target additional deceleration indicated by the one-dot chain line starts increasing from the position A, and is maintained approximately constant in an intermediate zone between the position A and the position B, whereafter it decreases, and becomes 0 at the position B. Subsequently, the target additional deceleration is kept at 0 from the position B to the position C. Then, the target additional deceleration starts increasing from the position C, and is maintained approximately constant in an intermediate zone between the position C and the position D, whereafter it decreases, and becomes 0 at the position B.

As described with reference to FIG. 4, when the steering wheel angle is determined in the step S21 to be increasing, and the absolute value of the steering speed is determined in the step S23 to be not decreasing, i.e., to be increasing or to have no change, the torque reduction amount-deciding section 18 operates in the step S24 to decide the target additional deceleration based on the steering speed. Subsequently, in the steps S25 and S26, the torque reduction amount-deciding section 18 operates to decide the maximum increase rate Rmax of the additional deceleration in the control of adding a deceleration to the vehicle 1, and decide the additional deceleration in each processing cycle, under the condition that the increase rate of the additional deceleration is equal to or less than the $R_{max}$.

FIG. 7D depicts a case where an increase rate of the target additional deceleration starting increasing from each of the position A and the position C is greater than the $R_{max}$. In this case, the torque reduction amount-deciding section 18 operates to increase the additional deceleration at an increase rate equal to the $R_{max}$ (i.e., at an increase rate providing a gentler slope than that of the target additional deceleration indicated by the one-dot chain line). As depicted in FIG. 6, the gain of the increase rate of the additional deceleration is set such that it becomes smaller as the steering wheel angle becomes larger, so that the maximum increase rate Rmax of the additional deceleration is reduced to a smaller value as the steering wheel angle becomes larger. Thus, as depicted in FIG. 7D, in each of the intermediate zone between the position A and the position B and the intermediate zone between the position C and the position D, as the steering wheel angle becomes larger, the maximum increase rate Rmax of the additional deceleration becomes smaller, and the increase rate of the additional deceleration becomes gradually smaller (i.e., a slope of the solid line in FIG. 7D becomes gradually gentler).

Further, the steering wheel angle at the position C is greater than the steering wheel angle at the position A. Thus, as depicted in FIG. 7D, the increase rate of the additional deceleration during traveling from the position C to the position D is less than the increase rate of the additional deceleration during traveling from the position A to the position B (i.e., the slope of the solid line in FIG. 7D is gentler).

Further, when the target additional deceleration is maintained approximately constant in each of the intermediate zone between the position A and the position B and the intermediate zone between the position C and the position D, the torque reduction amount-deciding section 18 operates to decide that the additional deceleration is equal to the target additional deceleration.

Further, when the absolute value of the steering speed is determined, in the step S23 depicted in FIG. 4, to be decreasing, the torque reduction amount-deciding section 18 operates to maintain the additional deceleration at the maximum steering speed, as mentioned above. Specifically, in FIG. 7D, when the steering speed decreases toward the respective positions B, D, the target additional deceleration indicated by the one-dot chain line also decreases along therewith, but the additional deceleration indicated by the solid line is maintained at its maximum value, until the vehicle 1 reaches the respective positions B, D.

On the other hand, when the absolute value of the steering speed is determined, in the step S21 depicted in FIG. 4, to be maintained constant or to be decreasing, the torque reduction amount-deciding section 18 operates to obtain the deceleration reduction amount in the step S29, and reduce the last additional deceleration by the obtained deceleration reduction amount, as mentioned above. Specifically, as depicted in FIG. 7D, the torque reduction amount-deciding section 18 operates to reduce the additional deceleration to cause the change rate of the additional deceleration to become gradually smaller, i.e., to cause the slope of the solid line indicative of a change in the additional deceleration to become gradually gentler.

Figure 7E:
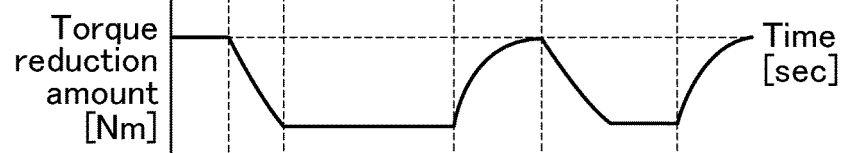

FIG. 7E is a diagram depicting a change in the torque reduction amount decided based on the additional deceleration depicted in FIG. 7D. In FIG. 7E, the horizontal axis represents the time, and the vertical axis represents the torque reduction amount.

As mentioned above, the torque reduction amount-deciding section 18 operates to decide a value of the torque reduction amount required for realizing an additional deceleration, based on the current vehicle speed, gear stage, road gradient and others. Thus, in the case where respective values of these parameters are constant, the torque reduction amount is decided such that it changes in the same pattern as that of the additional deceleration depicted in FIG. 7D.

Thus, assume that, when the steering angle is increasing from the respective positions A, C, the torque reduction amount-deciding section 18 operates to obtain the target additional deceleration based on the steering speed, and decide the additional deceleration in each processing cycle, under the condition that the increase rate of the additional deceleration is equal to or less than the $R_{max}$. In this case, as described with reference to FIG. 7D, in each of the intermediate zone between the position A and the position B and the intermediate zone between the position C and the position D, as the steering wheel angle becomes larger, the maximum increase rate Rmax of the additional deceleration becomes smaller, and the increase rate of the additional deceleration becomes gradually smaller. Thus, an increase rate of the torque reduction amount becomes smaller as the steering wheel angle becomes larger. That is, as depicted in FIG. 7E, a slope of a curve indicative of a change rate during increasing of the torque reduction amount.

Figure 7F:
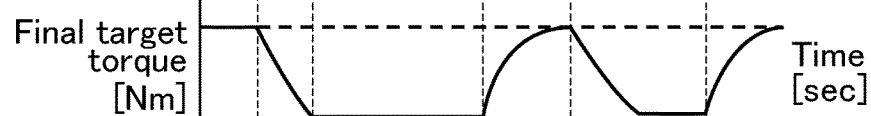

FIG. 7F is a diagram depicting a change in the final target torque decided based on the basic target torque and the torque reduction amount. In FIG. 7F, the horizontal axis represents the time, and the vertical axis represents the torque. In FIG. 7F, the dotted line indicates the basic target torque, and the solid line indicates the final target torque.

As described with reference to FIG. 3, the final target torque-deciding section 20 operates to subtract the value of the torque reduction amount decided by the torque reduction amount-deciding processing in the step S4, from the value of the basic target torque decided in the step S3, to thereby decide the final target torque.

Figure 7G:
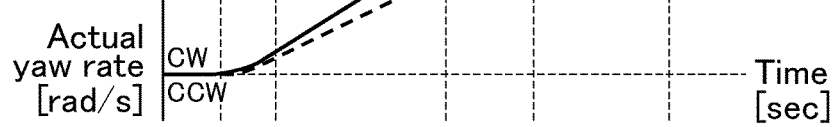

FIG. 7G is a diagram depicting a change in yaw rate (actual yaw rate) generated in the vehicle 1 when control of the engine 4 is performed based on the final target torque depicted in FIG. 7F, and a change in actual yaw rate generated in the vehicle 1 when the control of the engine 4 based on the torque reduction amount decided by the torque reduction amount-deciding section is not performed (i.e., the control of the engine 4 is performed so as to realize the basic target torque indicated by the dotted line in FIG. 7F). In FIG. 7G, the horizontal axis represents the time, and the vertical axis represents the yaw rate. Further, FIG. 7G, the solid line indicates a change in the yaw rate (actual yaw rate) generated when the control of the engine 4 is performed so as to realize the final target torque, and the dotted line indicates a change in the actual yaw rate generated when the control compatible with the torque reduction amount is not performed.

When clockwise steering is started at the position A, and the torque reduction amount is increased along with an increase in the clockwise steering speed, as depicted in FIG. 7E, a load applied to the front road wheels 2 as steerable road wheels of the vehicle 1 is increased. As a result, a frictional force between each of the front road wheels 2 and a road surface is increased and thus a cornering force of the front road wheels 2 is increased, thereby providing an improved turn-in ability of the vehicle 1. That is, as depicted in FIG. 7G, when the control of the engine 4 is performed in the intermediate zone between the position A and the position B so as to realize the final target torque reflecting the torque reduction amount (solid line), a clockwise (CW) yaw rate becomes larger, as compared to the case where the control compatible with the torque reduction amount is not performed (dotted line).

Then, as depicted in FIGS. 7D and 7E, although the target additional deceleration decreases along with a decrease in the steering speed toward the position B, the load applied to the front road wheels is maintained as long as the tuning of the steering wheel is continued, because the torque reduction amount is maintained at its maximum value. Thus, it becomes possible to maintain the turn-in ability of the vehicle 1.

Then, when the absolute value of the steering wheel angle is kept constant during traveling from the position B to the position C, the torque reduction amount is smoothly reduced. Thus, in response to completion of the turning of the steering wheel, the load applied to the front road wheels 2 can be gradually reduced to gradually reduce the cornering force of the front road wheels 2, thereby restoring the output torque of the engine 4, while stabilizing a vehicle body.

Then, when the clockwise additional turning operation of the steering wheel is started at the position C, and the torque reduction amount is increased along with an increase in the clockwise steering speed, as depicted in FIG. 7E, the load on the front road wheels 2 of the vehicle 1 is increased to provide improved turn-in ability, as with the case where the clockwise additional turning operation of the steering wheel is started at the position A. Thus, when the control of the engine 4 is performed in the intermediate zone between the position C and the position D so as to realize the final target torque reflecting the torque reduction amount (solid line), a larger clockwise (CW) yaw rate is generated in the vehicle 1, as compared to the case where the control compatible with the torque reduction amount is not performed (dotted line). However, as mentioned above, the increase rate of the additional deceleration during traveling from the position C to the position D is less than the increase rate of the additional deceleration during traveling from the position A to the position B. Thus, a level of the increase in the yaw rate resulting from performing the control of the engine 4 so as to realize the final target torque reflecting the torque reduction amount during traveling from the position C to the position D is suppressed to be less than a level of the increase in the yaw rate during traveling from the position A to the position B.

Next, some modifications of the above embodiment will be described.

Although the above embodiment has been described based on an example in which the torque reduction amount-deciding section 18 is configured to obtain the target additional deceleration based on the steering speed as the yaw rate-related quantity, and decide the torque reduction amount based on the obtained target additional deceleration, the torque reduction amount-deciding section 18 may be configured to decide the torque reduction amount based on any driving state of the vehicle 1 other than the accelerator pedal operation (e.g., steering wheel angle, yaw rate, or slip ratio).

For example, the torque reduction amount-deciding section 18 may be configured to calculate, as the yaw rate-related quantity, a target yaw acceleration to be generated in the vehicle 1, based on a target yaw rate calculated from the steering wheel angle and the vehicle speed, and a yaw rate input from a yaw rate sensor, and obtain the target additional deceleration based on the calculated target yaw acceleration to decide the torque reduction amount. Alternatively, it is also possible to detect, by an acceleration sensor, a lateral acceleration to be generated in the vehicle 1 along with turning of the vehicle 1, as the yaw rate-related quantity, and decide the torque reduction amount based on the detected lateral acceleration.

The above embodiment has been described based on an example in which the vehicle 1 equipped with the vehicle behavior control device has the engine 4 for driving drive road wheels. However, the vehicle behavior control device of the present invention may also be applied to a vehicle having a motor for driving the drive road wheels by electric power supplied from a battery or a capacitor. In this case, the PCM 14 may be configured to perform control to reduce a torque of the motor according to the steering speed of the vehicle 1.

Next, advantageous effects of the vehicle behavior control device according to the above embodiment and the modifications thereof will be described.

The PCM 14 is operable to reduce a change rate during increasing of the torque reduction amount according to the steering speed, to a smaller value, as the steering wheel angle of the steering wheel of the vehicle 1 becomes larger, so that it becomes possible to reduce a change rate of a deceleration to be added to the vehicle 1 based on the reduction in torque, to a smaller value, as the steering wheel angle becomes larger, and thus allow an increase in cornering force based on an increase in load on the front road wheels to become gentle. This makes it possible to prevent the turn-in ability of the vehicle 1 from being excessively improved in response to an operation of additionally turning the steering wheel during vehicle turning, and thus perform a vehicle behavior control to accurately realize a vehicle behavior as intended by a driver, without giving any uncomfortable feeling to a driver in regard to a vehicle behavior responsive to the additional turning operation.

In particular, the PCM 14 is operable, when the steering wheel angle is increasing, to reduce the torque according to the steering speed. This makes it possible to, in response to start of a steering wheel operation, quickly apply a load to the front road wheels according to the steering speed, while avoiding giving an uncomfortable feeling to a driver in regard to a vehicle behavior responsive to the additional turning operation, thereby providing an improved responsiveness to a steering wheel turning operation, and performing a vehicle behavior control to accurately realize a vehicle behavior as intended by the driver.

Further, the PCM 14 is operable to decide a target additional deceleration to be added to the vehicle 1, according to the steering speed, and reduce the torque for the vehicle 1 so as to realize the target additional deceleration, and to reduce a change rate during increasing of the target additional deceleration, to a smaller value, as the steering wheel angle becomes larger, so that it becomes possible to reduce a change rate of a deceleration to be added to the vehicle 1, to a smaller value, as the steering wheel angle becomes larger, to thereby reduce the torque so as to allow an increase in cornering force based on an increase in load on the front road wheels to become gentle. This makes it possible to reliably prevent the turn-in ability of the vehicle 1 from being excessively improved in response to the operation of additionally turning the steering wheel during vehicle turning, and thus perform the vehicle behavior control to accurately realize a vehicle behavior as intended by a driver, without giving any uncomfortable feeling to a driver in regard to a vehicle behavior responsive to the additional turning operation.

What is claimed is:

1. A vehicle behavior control device for controlling a behavior of a vehicle having steerable front road wheels, an engine or a motor and a steering wheel operated by a driver, the vehicle behavior control device comprising:
   a processor; and
   a memory storing one or more programs that, when executed by the processor, cause a generated torque control means to perform control, when a steering speed of the steering wheel is greater than a threshold, to reduce a generated torque of the engine or the motor according to the steering speed of the steering wheel,
   wherein the generated torque control means is operable to reduce rate of decrease of an amount of the generated torque during decreasing the amount of the generated torque according to the steering speed, as a steering wheel angle of the steering wheel increases.

2. The vehicle behavior control device as recited in claim 1, wherein the generated torque control means is operable, when the steering wheel angle is increasing, to reduce the generated torque according to the steering speed.

3. The vehicle behavior control device as recited in claim 1, wherein the generated torque control means is operable to decide a target additional deceleration to be further applied to the vehicle, according to the steering speed, and reduce the generated torque so as to realize the target additional deceleration, and to reduce a change rate during increasing of the target additional deceleration, as the steering wheel angle increases.

4. The vehicle behavior control device as recited in claim 1, wherein the generated torque control means is operable to control the behavior of the vehicle by using a torque generated from the engine as the generated torque.

* * * * *